US012753642B2

(12) United States Patent
Duriez et al.

(10) Patent No.: US 12,753,642 B2
(45) Date of Patent: Oct. 6, 2026

(54) LATCH ASSEMBLY

(71) Applicant: Minebea AccessSolutions France, Alfortville (FR)

(72) Inventors: Laurent Duriez, Alfortville (FR); François Debroucke, Alfortville (FR); Robin Duvauchelle, Alfortville (FR)

(73) Assignee: Minebea AccessSolutions France, Alfortville (FR)

( * ) Notice: Subject to any disclaimer, the term of this patent is extended or adjusted under 35 U.S.C. 154(b) by 0 days.

(21) Appl. No.: 18/974,916

(22) Filed: Dec. 10, 2024

(65) Prior Publication Data

US 2025/0198205 A1 Jun. 19, 2025

(30) Foreign Application Priority Data

Dec. 15, 2023 (EP) .................................... 23315456

(51) Int. Cl.
*E05B 81/14* (2014.01)
*E05B 81/06* (2014.01)
(Continued)

(52) U.S. Cl.
CPC .............. *E05B 81/14* (2013.01); *E05B 81/06* (2013.01); *E05B 81/66* (2013.01); *E05B 85/243* (2013.01)

(58) Field of Classification Search
CPC .......... E05B 81/14; E05B 81/06; E05B 81/66; E05B 81/22; E05B 81/20; E05B 81/68; E05B 81/25; E05B 81/28; E05B 81/64; E05B 81/24; E05B 81/16; E05B 85/243; E05B 85/26; E05B 85/247; E05B 85/01; E05B 85/24; E05B 83/40; E05B 79/00; E05B 79/08; Y10T 292/1082; Y10T 292/1047; Y10T 292/699; Y10T 292/1078;
(Continued)

(56) References Cited

U.S. PATENT DOCUMENTS 5,938,252 A * 8/1999 Uemura .................. E05B 81/14 292/216
6,679,531 B2 * 1/2004 Rogers, Jr. .............. E05B 83/16 292/216
(Continued)

FOREIGN PATENT DOCUMENTS

DE 37 21 962 A1 1/1989
DE 4430736 C1 * 11/1995 ......... E05B 47/0002
(Continued)

OTHER PUBLICATIONS

Extended European Search Report issued May 27, 2024 in European Application 23315456.6 filed on Dec. 15, 2023, 5 pages (with Written Opinion).

*Primary Examiner* — Steven A Tullia
(74) *Attorney, Agent, or Firm* — Oblon, McClelland, Maier & Neustadt, L.L.P.

(57) ABSTRACT

A latch assembly collaborates with a striker. The latch assembly includes a rotary bolt to move between an open position where the striker is released and a closed position in which the striker is blocked by the rotary bolt. The latch assembly also includes a motorized assistance lever having a general U-shaped form and arranged to pivot around an axis located on one branch to catch the striker with one branch upfront the rotary bolt and an ejection position to eject with the other branch out of the rotary bolt.

14 Claims, 2 Drawing Sheets

(51) Int. Cl.
*E05B 81/66* (2014.01)
*E05B 85/24* (2014.01)

(58) Field of Classification Search
CPC ............. Y10T 292/702; Y10T 70/5093; Y10S 292/55; Y10S 292/23
See application file for complete search history.

(56) References Cited

U.S. PATENT DOCUMENTS

| | | | | |
|---|---|---|---|---|
| 6,733,078 | B1 * | 5/2004 | Zelmanov | B60N 2/366 292/216 |
| 8,894,107 | B2 * | 11/2014 | Kamata | B60N 2/01583 292/216 |
| 9,382,731 | B2 * | 7/2016 | Kim | B62D 25/12 |
| 9,903,143 | B2 * | 2/2018 | Hiramoto | E05B 81/68 |
| 10,428,563 | B2 * | 10/2019 | Kwak | E05B 81/20 |
| 10,648,202 | B2 | 5/2020 | Scholz et al. | |
| 10,669,751 | B2 * | 6/2020 | Kim | E05B 81/66 |
| 10,767,396 | B2 * | 9/2020 | Distefano | E05B 85/26 |
| 11,008,780 | B2 * | 5/2021 | Oxley | E05C 17/203 |
| 11,428,032 | B2 * | 8/2022 | Sturm | E05B 83/24 |
| 11,781,349 | B2 * | 10/2023 | Klein | E05B 77/08 180/274 |
| 11,933,082 | B2 * | 3/2024 | Strole | E05B 83/18 |
| 2010/0170308 | A1 | 7/2010 | Wattebled et al. | |
| 2010/0194120 | A1 | 8/2010 | Kaiser et al. | |
| 2016/0340939 | A1 | 11/2016 | Scholz et al. | |
| 2017/0253281 | A1 * | 9/2017 | Kwak | E05B 81/04 |
| 2017/0284134 | A1 | 10/2017 | Schwickerath et al. | |
| 2019/0003214 | A1 * | 1/2019 | Cumbo | E05B 81/25 |
| 2021/0023967 | A1 * | 1/2021 | Noguchi | B60N 2/919 |
| 2024/0076914 | A1 * | 3/2024 | Regueiro Blanco | B62D 25/12 |

FOREIGN PATENT DOCUMENTS

| | | | | |
|---|---|---|---|---|
| DE | 10309643 | A1 * | 9/2004 | E05B 81/20 |
| DE | 102010061518 | B4 * | 3/2022 | E05B 83/24 |
| EP | 4276265 | A1 * | 11/2023 | E05B 81/14 |
| JP | H0776964 | A * | 3/1995 | E05B 81/20 |
| JP | 2527494 | Y2 * | 2/1997 | E05B 65/19 |
| JP | 5732694 | B2 | 6/2015 | |
| WO | WO-2018192608 | A1 * | 10/2018 | E05B 83/24 |
| WO | WO-2023285498 | A1 * | 1/2023 | E05B 81/66 |

* cited by examiner

LATCH ASSEMBLY

The invention relates to the field of latch assemblies, and more specifically latch assemblies for motor vehicles.

Modern motor vehicles are increasingly provided with closure panels, for example doors, trunk lids, which can be operated without a traditional key type mechanism. In this regard, electric power closure systems are becoming increasingly common to remotely assist the locking/unlocking and opening/closing of such closure panels wherein a powered latch assembly is controlled by a power operated actuator. Such power closure systems are especially configured to automatically close a closure panel when it is not fully shut to avoid safety risks caused by improper closing.

The latch assembly is usually provided on the closure panel, and typically comprises a claw and pawl mechanism able to collaborate with a striker provided on the closure panel frame. The claw and pawl mechanism comprises a rotary bolt, notably in the form of a fork (said claw), able to move between an open position where the striker is released, in particular to allow opening of the door, and a closed position in which the striker is blocked by the rotary bolt to allow secure closing of the door. A pivoting catch (said pawl) is also provided and is configured to push the catch towards a holding position, in which the catch is able to cooperate with at least one notch of the bolt in order to hold the bolt in closed position.

For automatic and secure closing of the door, the latch assembly is further provided with a motorised assistance mechanism controlled by a power operated actuator. However, for opening the door, the actuator is provided with another mechanism, notably an ejector mechanism, which is typically independent from the assistance mechanism. Such arrangements are usually complicated and require additional mechanical elements as well as additional electronic elements, such as sensors, to bring about the automatic secure closing and opening of the door.

The purpose of the present invention is to provide a latch assembly which ensures automatic secured closing and opening of closure panels, notably for motor vehicle doors, while providing for a simplified arrangement.

To that end, the invention is directed towards a latch assembly for collaboration with a striker comprising:

- a rotary bolt configured to move between an open position where the striker is released and a closed position, in which the striker is blocked by the rotary bolt, wherein the latch assembly further comprises a motorised assistance lever having a general U-shaped form and configured to pivot around an axis located on one branch allowing to catch the striker with one branch upfront the rotary bolt and an ejection position allowing to eject with the other branch out of the rotary bolt.

Herein, the assistance lever is arranged in a way to allow effective attraction and blocking of the striker as well as ejecting the striker. Hence, the same assistance lever integrates an attraction and a blocking feature, notably for automatic and motorised closing of a closure panel, and ejecting feature, notably for automatically opening of the closure panel. Contrary to the prior art, here no additional ejection mechanism is required to bring about the ejection feature. Therefore, the proposed assembly is greatly simplified and cost of production is also reduced.

Furthermore, the assistance lever is able to catch the striker upfront the rotary bolt to allow a "smooth blocking" function. Indeed, the assistance lever catches the striker for guiding said striker towards the rotary bolt so as to prevent any abrupt contact between the rotary bolt and the striker and any abrupt position change of the rotary bolt.

In the same way, when the rotary bolt moves to the open position for ejecting the bolt, the assistance lever is able to assist the striker ejection smoothly out of the rotary bolt.

The U-shape of the assistance lever is advantageously adapted for this purpose. In particular, one branch, is able to catch the striker, and the other branch is able to supply sufficient pushing and pivoting force to allow ejection of the striker, especially when additional force is required, for example for breaking the ice between the closure panel and its frame.

The latch assembly may further present one or more of the following characteristics taken separately or in combination.

- One branch of the assistance lever is provided with a sensor configured to detect the presence of the striker.

When the assistance lever catches the striker, the sensor, provided on a branch, detects the striker's presence so as to start the motorised rotation of the assistance lever. Preferably, the sensor is provided on the branch configured to catch the striker upfront of the rotary bolt.

The sensor is preferably configured to communicate with a central computer, preferably integrating a processing unit, able to control activation of the rotation of the assistance lever.

- Each branch of the assistance lever comprises a free-end, the free-ends being spaced from each other by a distance adapted to clasp the striker.

Preferably, the distance between each branch end sensibly corresponds to the size of a graspable portion of the striker.

Thanks to the closely spaced free-ends, the branches are able to tightly fit around the striker so as to smoothly and securely accompany the striker when it collaborates with the rotary bolt, especially towards the closed position.

- One branch comprises a curved form.

The curved form of the branch is preferably adapted for detecting the striker and smoothly accompanying the striker. Therefore, the curved branch is able to accompany the striker towards the rotary bolt, notably in closed position. Such a curved portion is advantageous as it allows smooth pivoting movement of the assistance lever.

- One branch comprises two angled portions.

The two angled portions are configured for allowing easier grasping of the striker. Preferably, the two angled portions are angularly separated by an obtuse angle.

Preferably, one branch comprises a curved form and the other branch comprises two angled portions. Hence, while the curved branch allows smooth pivoting movement for accompanying the striker between the open and closed positions of the rotary bolt, the angled branch allows easier and secure grasping of the striker.

- The latch assembly further comprises a housing on which the rotary bolt is pivotably mounted, the assistance lever being mounted on the housing.

Hence, a same latch assembly is able to integrate opening and closing features and automatic assistance of the catching and ejecting of the striker by the presence of the assistance lever.

- The latch assistance lever is pivotably operated by a power actuator by means of a lift lever.

The latch assistance is controlled by a power actuator which is configured to supply energy for effective blocking and release of the striker in view of the automatic closing and opening of a closure panel. Here, energy transfer means are decomposed into two parts so as to be able to provide for a higher pivoting force of the assistance lever with minimal energy supply.

The lift lever comprises a first end connected to the power actuator and a second end engaged in an oblong opening provided on the assistance lever.

Thanks to the oblong opening the lift lever is able to actuate the pivoting movement of the assistance lever be it for automatically opening a closure panel or for closing the closure panel.

The lift lever is slidably mounted on a linear guiding rail provided on the housing.

Hence, a linear movement of the lift lever is able to bring about a pivoting moment of the assistance lever. Here again, with minimal energy supply the resulting pivoting force of the assistance lever is increased for more effective blocking of the striker or ejecting of the striker. Such an arrangement is also beneficial as it increases the rotational degree of the assistance lever which can further securely tighten the striker in closed position of the rotary bolt and also provide sufficient force for ejecting the striker for opening the closure panel.

The rotary bolt moves around a rotation axis which is located between the branches of the U-shaped assistance lever.

Such arrangement increases the compacity of the latch assembly.

The rotary bolt and the assistance lever are arranged in a coplanar or non-coplanar way, such that the rotary bolt superposes at least one branch of the assistance lever (in a frontal view).

The assistance lever is independent from the rotary bolt.

The invention further relates to a closure panel comprising a latch assembly as described above.

BRIEF DESCRIPTION OF THE FIGURE

The invention will be better understood and other characteristics and advantages will appear at the reading of the following description, given in an illustrative and non-limiting fashion, referring to the annexed figures in which.

DETAILED DESCRIPTION

Figure 1:
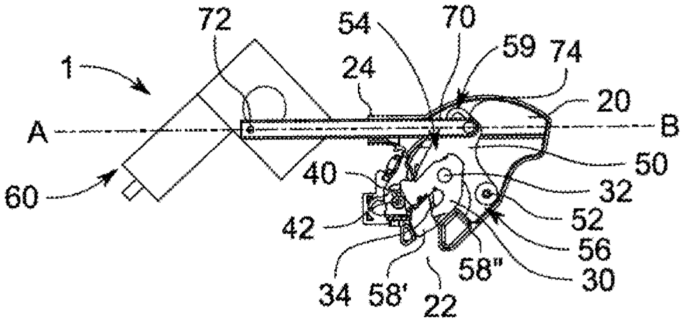
FIG. 1 is a frontal view of a latch assembly.

FIG. 1 is a frontal view of a latch assembly 1 adapted for a closure panel, for example a vehicle door or a trunk lid. Such a latch assembly is configured for automatic closing and opening of these closure panels, notably by collaboration with a striker 10 (not visible on FIG. 1) which is provided on the closure panel frame. For example, for a vehicle door, notably a sliding vehicle door, the latch assembly 1 is mounted on a vehicle door and the striker is provided on the vehicle door frame opposite to the latch assembly 1. The vehicle door can be automatically and remotely controlled to move towards the door frame where the latch assembly 1 can allow automatic closing by collaborating with the striker 10, and the vehicle door can be pushed open by the same latch assembly 1. Hence, the same latch assembly 1 is able to integrate the opening and closing functions. This automatic opening and closing of the door will be explained in the following paragraphs. In the following description, the example of a vehicle door for a closure panel will be maintained. However, the latch assembly 1 can be imagined in any other type of closure panels requiring automatic closing and opening.

The latch assembly 1, shown in FIG. 1, comprises a rotary bolt 30 and an assistance lever 50. The assistance lever 50 is arranged in a way to be operated by a power actuator 60 in order to assist secure automatic closing and opening features of the latch assembly 1.

Figure 2:
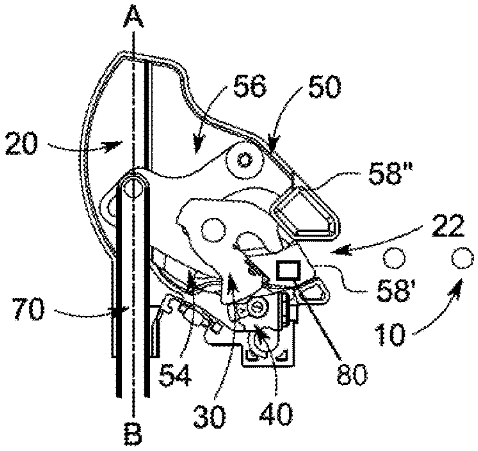
FIG. 2 is part of the frontal view from FIG. 1 wherein the latch assembly is placed opposite a striker.

More specifically, the latch assembly 1, as shown in FIGS. 1 and 2, comprises a housing 20 provided with a slot 22 arranged opposite to the striker 10. The rotary bolt 30 is pivotably mounted on the housing 20, notably around an axis 32, between an open position and a closed position.

The rotary bolt 30 is in the form of a fork comprising a recess 34 configured to receive the striker 10, or at least a graspable part of the striker 10. In the open position, the recess 34 of the rotary bolt 30 is placed in a way to overlap with the slot 22 of the housing 20. Therefore, in the open position, the rotary bolt 30 is able to collaborate with the striker 10, that is the rotary bolt 30 is able to engage with the graspable portion of the striker 10, notably in view of closing the vehicle door which can be remotely requested by a user. In the same open position, the rotary bolt 30 is able to release the striker 10, notably in view of opening the vehicle door which can also be remotely requested by the user, notably by making use of a control key.

In the closed position, in order to block the striker 10, the rotary bolt 30 is pivoted away from the slot 22 of the housing 20, here in a clockwise direction. Hence, in the closing position, the striker 10 is blocked to prevent any accidental opening of the door.

In particular, the rotary bolt 30 is biased (for example with a torsion spring or other biasing element) to pivot towards the open position. Actually, the open position can correspond to a rest position of the rotary bolt. When the closing of the vehicle door is requested manually or remotely, the latter moves towards the striker 10 with a closing vigour (force) which causes the striker 10 to engage into the recess 34, and the biased rotary bolt 30 is able to pivot towards the closed position. When the opening of the vehicle door is requested, the latch assembly 1 moves with the vehicle door to allow the striker 10 to be pulled out of the recess 34, the biased rotary bolt can therefore regain the open position.

The latch assembly 1 further comprises a catch 40 pivotably mounted on the housing around an axis 42 which is parallel to the rotation axis 32 of the rotary bolt. The catch 40 is configured to rotate in an opposite direction with regard to the pivoting direction of the rotary bolt 30. The catch 40 is preferably controlled by a motorised actuator (not shown) which is in turn controlled by a central computer (not shown). The operation of the motorised actuator of the catch 40 will not be explained in the present application.

When closing of the door is requested, the catch 40 is able to rotate in a clockwise direction to cooperate with the rotary bolt 30 in order to push said bolt towards its closed position. Preferably the rotary bolt 30 is provided with notches with which the catch 40 collaborates in order to hold the bolt 30 in closed position. Preferably, these notches allow placing the rotary bolt 30 in different closing positions. When opening of the door is requested, the catch 40 is able to rotate if a anti-clockwise direction so as to unblock the closed position of the rotary bolt 30 and allow said rotary bolt to return to the open position via the biasing mechanism.

The assistance lever 50 is pivotably mounted on the housing 20 around a rotation axis 52, which is parallel to the rotation axis 32 of the rotary bolt 30. The assistance lever 50 is configured to move in the same direction as the rotary bolt 30 and to collaborate with the striker 10 so as to ensure automatic closing and opening of the vehicle door.

To do so, the assistance lever 50 has a general U-shaped form, notably with two branches 54, 56. Each branch 54, 56 comprises a free-end 58', 58", the free-ends 58', 58" are spaced from each other by a distance adapted to clasp the striker 10. Preferably, the distance between each branch end 58', 58" sensibly corresponds to the size of the graspable portion of the striker 10. Thanks to the closely spaced free-ends 58', 58", the branches 54, 56 are able to tightly fit around the striker 10. The assistance lever 50 can hence assist the rotary bolt 30.

More specifically, the assistance lever 50 is configured to move between an open state and a tightening state. In the open state, a portion of one branch 54 of the assistance lever 50 overlaps the slot 22 of the housing 20 such that said branch is able to catch the striker 10 upfront the rotary bolt 30. Once the striker 10 comes into contact with the assistance lever 50, the lever is able to pivot and accompany the striker 10 towards the tightening state. Between the open state and the tightening state, the striker 10 also comes across the rotary bolt 30 and collaborates with the bolt 30, such that the rotary bolt 30 and the assistance lever 50 together allow a tightened blocking of the striker 10 in order to ensure safe closing of the vehicle door.

Preferably, the branch 54 is configured to catch the striker 10 and is provided with a sensor 80 configured to detect the presence of the striker 10 and for controlling the assistance lever 50. Alternatively, the sensor can also be arranged on the lift lever 70. In this case, the sensor can be a sensor that detects a movement or a force that the striker 10 exerts on the assistance lever 50. The sensor is preferably configured to communicate with a central computer or body controller (not shown), preferably integrating a processing unit, able to receive vehicle door opening and closing instructions. The details of this type of communication and control will not be extensively described here. Once the central computer or body controller is instructed to open or close the vehicle door, the assistance lever 50 is put in motion.

In doing so, the assistance lever 50 allows a "smooth blocking" function. Indeed, by catching the striker 10 upfront the rotary bolt, the assistance lever 50 is able to accompany the striker 10 towards the rotary bolt 30 so as to prevent any abrupt contact between the rotary bolt 30 and the striker 10, and also prevent any abrupt position change of the rotary bolt 30.

In the same way, when opening of the door is requested, the rotary bolt 30 moves from the closed position towards the open position for ejecting the striker 10, and the assistance lever 50 is able to assist the striker 10 ejection smoothly out of the rotary bolt 30. The branch 54 then regains its initial state where it overlaps the housing slot 22 awaiting the upcoming door closing request.

Hence, the same assistance lever 50 is able to integrate the automatic closing feature and opening feature of the vehicle door by allowing both the blocking of the striker 10 and its release.

Advantageously, one branch 54 of the assistance lever comprises a curved form. Preferably, the branch 54 configured to catch the striker 10 comprises a curved form. Such a curved form allows smooth pivoting of the assistance lever 50 inside the housing 20, notably for the "smooth blocking" and "smooth release" functions. Advantageously, the other branch 56 of the assistance lever comprises two angled portions, preferably the two angled portions are angularly separated by an obtuse angle. Such angled portions are configured for allowing easier grasping of the striker 10. Indeed, the curved branch 54 is adapted to contact the striker 10 and to smoothly accompany said striker between the open and closed positions of the rotary bolt 30, while the angled branch 56 is able to substantially and easily grasp the striker 10 once the assistance lever 50 starts moving, for securely taking the striker 10 towards the closed position of the rotary bolt 30.

The rotation axis 52 of the assistance lever is located on one branch 56, preferably on the branch comprising two angled portions. In such a configuration, the angled branch 56 is able to supply sufficient the pivoting force to the curved branch 54 to allow ejection of the striker 10. In order to increase the compactness of the latch assembly 1, the rotation axis 32 of rotary bolt is placed between the branches 54, 56 of the assistance lever 50.

The pivoting movement of the assistance lever 50 is independent from the pivoting movement of the rotary bolt 30. Both pivot in the same direction and only cooperate to allow the automatic opening and closing of the vehicle door. In fact, as it can be seen in FIGS. 1 and 2, the rotary bolt 30 and the assistance lever 50 are arranged in a non-coplanar way, such that the rotary bolt 30 superposes at least one branch 54 of the assistance lever 50. Alternatively, the rotary bolt 30 and the support lever 50 can be arranged in a coplanar way.

As mentioned above, the pivoting movement of the assistance lever 50 is controlled by the power actuator 60. The power actuator 60 is configured to supply energy for the automatic closing and opening of the vehicle door respectively for effective blocking and release of the striker 10.

In an emergency situation, if there is a malfunction or a power interruption, the latch assembly 1 or the assistance lever 50 can be activated manually. For this purpose, the actuator 60 is connected to the assistance lever 50 via a clutch (not shown) and this clutch can decouple the actuator 60 from the assistance lever 50.

The assistance lever 50 is pivotably operated by the power actuator 60 by means of a lift lever 70. Here, the energy transfer means are decomposed into two parts so as to be able to provide for a higher pivoting force of the assistance lever 50 with minimal energy supply. In this way, during release of the striker 10, the force provided is sufficiently large for effective automatic opening of the door. This is particularly useful in case additional force is required, for example for breaking the ice between the vehicle door and its frame.

More specifically, the lift lever 70 is in the form of a rod. The lift lever 70 comprises a first end 72 connected to the power actuator 60 and a second end 74 engaged in an oblong opening 59 provided on the assistance lever 50. As seen on FIGS. 1 and 2, the lift lever 70 is slidably mounted on a linear guiding rail 24 provided on the housing 20. The guiding rail 24 is formed by a linear bulge provided on the housing 20. This linear rail 24 allows the sliding of the lift lever 70 along a longitudinal axis AB of the lift lever 70. In particular, in the arrangement of the latch assembly 1 in FIG. 1, the lift lever 1 is able to slide forwardly and backwardly, and in FIG. 2, the lift lever 1 is able to slide upwardly and downwardly. Irrespective of the arrangement of the latch assembly 1, the lift lever 70 is able to slide along its longitudinal axis AB along the linear rail 24.

Thanks to engagement of the second end 72 of the lift lever 70 on the oblong opening 59 of the assistance lever 50, the linear movement of the lift lever 70 is able to bring about the pivoting moment of the assistance lever 50. For example, for opening a sliding vehicle door, the power actuator 60 supplies energy to the assistance lever 50 by sliding the lift lever 70 along the rail 24, such a sliding motion causes the assistance lever 50 to pivot between its open and tightening states. The energy supplied is amplified and the assistance lever 50 is able to provide an increased tightening force when the striker 10 is brought to the closed position, and an increased force for pushing the striker 10 with sufficient force to break the ice and cause the vehicle door to slide open. Therefore, with minimal energy supply the resulting pivoting force of the assistance lever 50 is increased for more effective blocking of the striker 10 or ejecting of the striker 10.

Such an arrangement is also beneficial as it increases the rotational degree of the assistance lever 50 which can further securely tighten the striker 10 in closed position of the rotary bolt 30 and also provide sufficient force for ejecting the striker 10 for opening the vehicle door. Actually, the length of the rail 24 highly contributes to this high rotational degree and high tightening force of the assistance lever 50, the longer the length, the higher is the rotational degree of the assistance lever 50 and the higher is the tightening force.

FIGS. 3A to 3E demonstrate the different steps leading to closing a vehicle door. For example, for a sliding vehicle door, the striker 10 is fixedly provided on the sliding door frame which approaches the latch assembly 1 provided on the vehicle door. When the striker 10 is close enough to the assistance lever 50 (FIG. 3B), the sensor provided on one branch end 58' detects the presence of the striker 10 and signals the central computer. The central computer can activate the actuator 60 for supplying energy to the assistance lever 50 so that it can move towards the tightening state. The actuator 60 supplies energy to the assistance lever 50 by moving the lift lever 70 along the linear rail 24 so as to cause a clockwise rotation of the assistance lever 50 in order to accompany the striker 10 towards the tightening state. In particular, the lift lever 70 is moved in an upward direction. During the pivoting moment of the assistance lever 50, the striker 10 is subsequently engaged into the rotary bolt 30 (FIG. 3C) which then rotates towards the closed position.

Figure 3A:
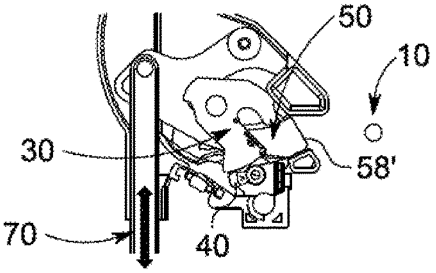
FIG. 3A, FIG. 3B, FIG. 3C, FIG. 3D, and FIG. 3E depict a series of views of the same latch assembly where the rotary bolt is moving towards a closed position, FIG. 4A, FIG. 4B, FIG. 4C.
Figure 3B:
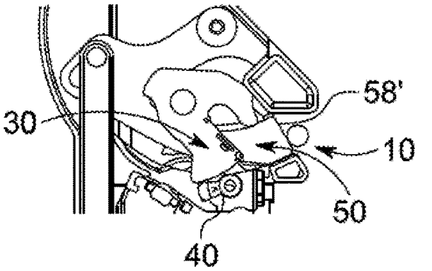
Figure 3C:
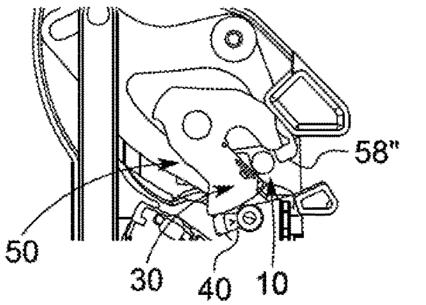
Figure 3D:
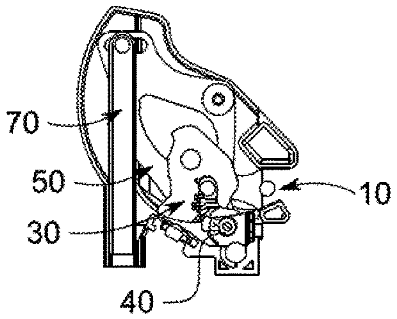
Figure 3E:
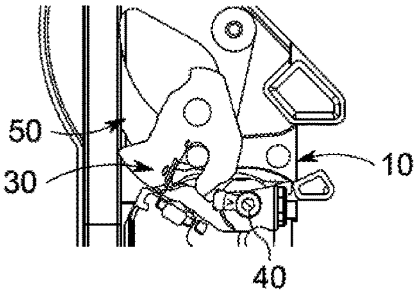

Advantageously, the rotary bolt 30 can present a first closed position wherein the catch 40 is engaged with a first notch of the rotary bolt 30 (FIG. 3D). In this case, the lift lever 70 has not reached its sliding stroke, but the vehicle door is closed. This may correspond to a "half-closed" situation wherein the latch assembly 1 collaborates with the striker 10 in a way to maintain the vehicle door securely closed. Though, the rotary bolt 30 is in a first closed position, the lift lever 7 can be further slid along the rail 24 until it reaches its sliding stroke to force the rotary bolt 30 to additionally rotate towards a "fully closed" optimal tightening situation, wherein the striker 10 is further secured to prevent accidental opening of the vehicle door.

Figure 4A:
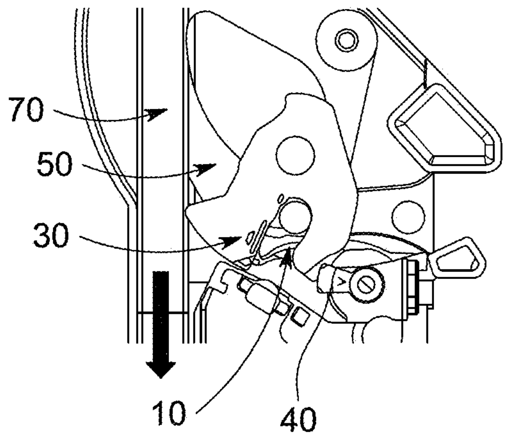
FIG. 4D, and FIG. 4E depict a series of views of the same latch assembly where the rotary bolt is moving towards an open position.
Figure 4B:
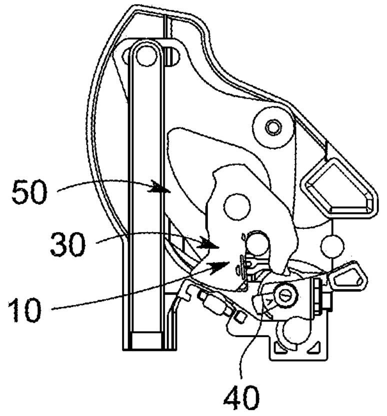
Figure 4C:
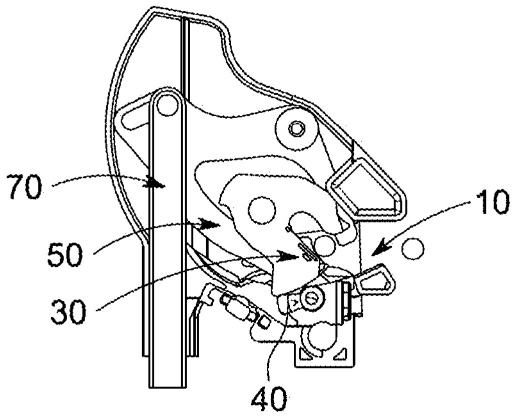
Figure 4D:
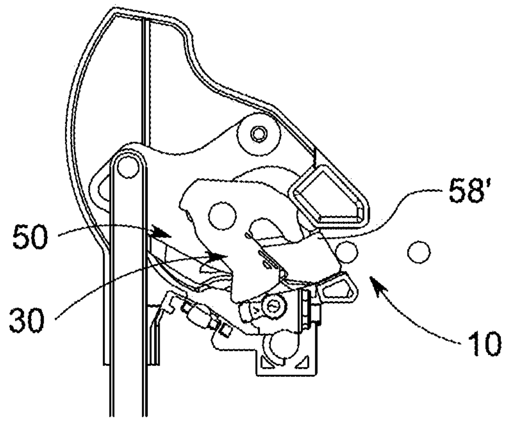
Figure 4E:
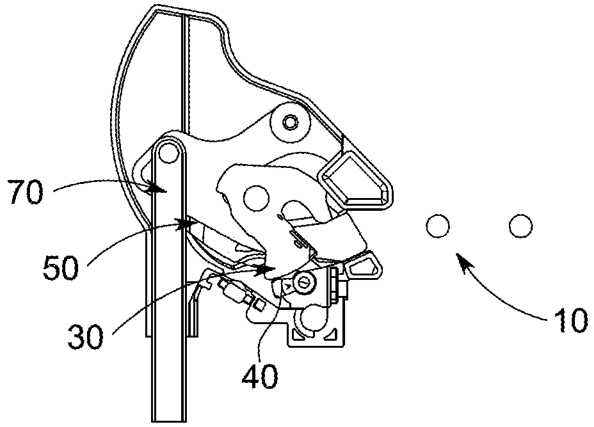

FIGS. 4A to 4E demonstrate the steps leading to opening the vehicle door. In FIG. 4A, the latch assembly 1 is in the same state as shown the FIG. 3E, where the vehicle door is securely closed. For automatically opening the door, the power actuator 60 supplies energy to the assistance lever 50 by sliding the lift lever 70 in the opposite direction, here downwards, to cause an anti-clockwise rotation of the assistance lever 50 (FIG. 4B). The rotational drive of the assistance lever 50 causes the striker 10 to move and hence causing the rotation of the rotary bolt 30. Therefore, the rotary bolt 30 also moves towards the open position. In FIG. 4C, the rotary bolt 30 reaches the open position, where the bolt recess 34 overlaps the housing slot 22 to release the striker 10. Though the striker 10 is released, contact is still maintained with an end 58' of one branch 54 (the curved branch) of the assistance lever 50 (FIG. 4D) while the assistance lever 50 continues its pivoting movement. In FIG. 4E, the lift lever 70 reaches its downward sliding stroke so that the curved branch 54 can push the striker 10 with sufficient force to push open the sliding vehicle door.

REFERENCE LIST

1: latch assembly
10: striker
20: housing
22: slot
24: guiding rail
30: rotary bolt
32: rotation axis of rotary bolt
34: recess
40: catch
42: rotation axis of catch
50: assistance lever
52: rotation axis of assistance lever
54, 56: branch
58', 58": free-end
59: oblong opening
60: power actuator
70: lift lever
72: first end
74: second end
AB: longitudinal axis of the lift lever

The invention claimed is:

1. A latch assembly for collaboration with a striker, comprising:
- a rotary bolt configured to move between an open position where the striker is released and a closed position in which the striker is blocked by the rotary bolt; and
- a motorized assistance lever having a general U-shaped form including a first branch and a second branch, and the assistance lever is configured to pivot around an axis located on the first branch to catch the striker with the second branch that extends further outward than the rotary bolt to contact the striker before the rotary bolt, and the assistance lever is configured to pivot to an ejection position to eject the striker out of the rotary bolt.

2. The latch assembly according to claim 1, wherein the second branch of the assistance lever is provided with a sensor configured to detect a presence of the striker.

3. The latch assembly according to claim 1, wherein each of the first branch and the second branch of the assistance lever comprises a free-end, the free-ends being spaced from each other by a distance adapted to clasp the striker.

4. The latch assembly according to claim 1, wherein the second branch comprises a curved form.

5. The latch assembly according to claim 1, wherein the second branch comprises two angled portions.

6. The latch assembly according to claim 1, further comprising a housing on which the rotary bolt is pivotably mounted, the assistance lever being mounted on the housing.

7. The latch assembly according to claim 1, wherein the assistance lever is pivotably operated by a power actuator via a lift lever.

8. The latch assembly according to claim 7, wherein the lift lever comprises a first end connected to the power actuator and a second end engaged in an oblong opening provided on the assistance lever.

9. The latch assembly according to claim 8, wherein the second end of the lift lever is further slidably mounted on a linear guiding rail provided on a housing.

10. The latch assembly according to claim 1, wherein the rotary bolt moves around a rotation axis which is located between the first branch and the second branch of the U-shaped assistance lever.

11. The latch assembly according to claim 1, wherein the rotary bolt and the assistance lever are non-coplanar such that the rotary bolt superposes at least one of the first branch and the second branch of the assistance lever in a frontal view.

12. The latch assembly according to claim 1, wherein the assistance lever is independent from the rotary bolt.

13. A closure panel comprising:

the latch assembly according to claim 1.

14. The latch assembly according to claim 1, wherein, in the ejection position, the second branch extends further outward than the rotary bolt to eject the striker out of the rotary bolt.

* * * * *